United States Patent [19]
Reichlinger

[11] Patent Number: 5,662,553
[45] Date of Patent: Sep. 2, 1997

[54] ELECTROMAGNETIC CLUTCH AND ENGINE CONTROL

[76] Inventor: Gary Reichlinger, P.O. Box 4, York, Nebr. 68467

[21] Appl. No.: 512,125

[22] Filed: Aug. 7, 1995

[51] Int. Cl.⁶ .................................................. B60K 41/02
[52] U.S. Cl. ........................ 477/179; 477/180; 477/181; 361/154
[58] Field of Search ...................... 477/166, 174, 477/175, 179, 180, 181; 361/154

[56] References Cited

U.S. PATENT DOCUMENTS

| | | | |
|---|---|---|---|
| 4,259,930 | 4/1981 | Hofbauer | 123/179 J |
| 4,377,223 | 3/1983 | Sakakiyama et al. | 361/154 X |
| 4,509,091 | 4/1985 | Booth | 361/154 |
| 4,651,855 | 3/1987 | Grunberg | 192/0.032 |
| 4,675,817 | 6/1987 | Sakakiyama et al. | 477/179 X |
| 4,730,712 | 3/1988 | Ohkumo | 477/179 X |
| 5,379,217 | 1/1995 | Mimura | 477/179 X |
| 5,416,665 | 5/1995 | Nishiwaki et al. | 361/154 |
| 5,461,563 | 10/1995 | Mimura | 477/179 X |

FOREIGN PATENT DOCUMENTS

90007787  7/1990  WIPO ................................. 361/154

*Primary Examiner*—Khoi Q. Ta

[57] ABSTRACT

The present invention provides a method and device for bringing the driven load of an internal combustion engine into motion by controlling the throttle or fuel delivery system of the engine and supplying a series of voltages to an electromagnetic clutch in a clutch engagement cycle. The throttle is set to a position or the fuel flow is regulated such that a specified torque output is produced by the engine. A detection means designates the time at which this output torque has been achieved. At this time, as designated by the detection means, a series of voltages is output to the clutch comprising a first voltage or voltage sequence to ensure engagement of the clutch, a second lower voltage to rapidly reduce holding torque to induce clutch plate slippage, a third voltage to maintain a desired rate of slippage, and a fourth voltage, preferably the rated voltage of the clutch, to lock the clutch plates together.

22 Claims, 5 Drawing Sheets

WHERE:
    $i$ = current in amperes
    V = voltage drop
    R = resistance in ohms
    $e$ = 2.718
    L = inductance in henries
    t = time in seconds

ELECTROMAGNETIC CLUTCH AND ENGINE CONTROL

TECHNICAL FIELD

This present invention relates to interrelated control of a throttle or fuel supply system of an internal combustion engine and an electromagnetic clutch. In one of its preferred aspects, it relates to a clutch engagement cycle featuring several different voltage levels to the clutch in coordination with a regulated engine power setting.

BACKGROUND INFORMATION

Electromagnetic clutches are well established in the art. U.S. Pat. No. 1,880,061 was issued in 1932 for the first electromagnetic clutch. While they are best known for their use on automotive air-conditioning compressors, they have found a number of uses. They are less expensive than other types of clutches and are commercially available from a number of sources in various holding torque capacities. Their simplicity of operation leads to reliability and control without external actuators.

Despite these advantages, there are still a number of areas where they have not come into general use. One limitation has been the difficulty encountered in situations involving internal combustion engines driving high inertia loads. An example of such an application is use on an oil well pumping unit.

There are several reasons that electromagnetic clutches have problems with high inertia loads. First, it is normal engineering practice to select a clutch rated at a somewhat higher peak holding torque than the expected load so that there is no inadvertent slippage and wear in its operation. Secondly, it typically takes about two-thirds of the rated voltage to reliably engage the clutch, but only a very low voltage to hold the friction plates together after they have made contact. This is because the ferromagnetic material in the plates has a far higher magnetic permeability than the air gap separating them and can convey much greater magnetic force at a given current level. A third consideration is that, like any electromagnetic device, an electric clutch has inductance. This means that the rising magnetic field tends to resist the flow of current for a period of time after the voltage is applied. Conversely, the falling magnetic field tends to induce current after the voltage is removed. Since the holding torque of the clutch is proportional to the amount of current flowing, this results in a delay factor in the establishment or removal of holding torque. Typically, it takes about 100 milliseconds for holding torque to rise from zero to two-thirds of its maximum upon the application of voltage with commercially available electromagnetic clutches. A similar delay occurs when voltage is removed for the fall of holding torque. The combined result of these factors is that electromagnetic clutches tend to engage at high holding torques and a delay is built in before any action to reduce holding torque can be effective.

The manner in which the engine power is controlled can also be a contributing factor to this problem. A common means of controlling an engine is a mechanical governor which uses springs and flyweights to position a throttle to maintain a preset speed. This arrangement has the engine set at full throttle prior to the engine being started. Often a device such as a solenoid is employed to pull the throttle back, against the force of the governor springs, to a low speed idle position for starting and warmup. If such an idle control device is present, it is released prior to attempting to put the engine under load. After warmup, with or without an idle controller, the engine is then allowed to run at the governed speed at a low power setting, or governed idle speed, since no load has yet been applied. Another means of controlling the engine is an electronic governor, as in U.S. Pat. No. 5,003,948. The electronic governor typically calculates speed by measuring the time between pulses from one of several known types of electronic sensors and adjusts the throttle position with an actuator to maintain a preset speed. Solenoids and stepper motors are often used as throttle actuators and a variety of methods are known for mounting them on engines and linking them to throttles. Also, electronic governors are used to control fuel injectors on engines so equipped. Engines controlled by any of these means are referred to as speed-governed engines.

There is a typical sequence of events that occurs when an electromagnetic clutch is used on an internal combustion engine driving a high inertia load. First the engine is started, warmed up, and run at governed speed. Then voltage is applied to the clutch. The clutch engages, after a delay of about 100 milliseconds for the magnetic field to build and about another 20 milliseconds for the friction plates to move together, at a high holding torque. This holding torque is far greater than the torque being developed by the engine at governed idle speed. The inertia of the load then causes the engine to decelerate very rapidly. The governor opens the throttle or activates the fuel supply system very rapidly often causing instability in the fuel mixture, particularly in carbureted engines. The engine further slows down to a speed well below its optimum torque producing speed and is overwhelmed by the load. In this scenario, the engine never reaches its maximum torque producing capability and the clutch provides very limited slippage action to help start the load in motion.

SUMMARY OF THE INVENTION

This present invention provides a method and device to facilitate the use of electromagnetic clutches on internal combustion engines driving high inertia loads. This is accomplished by controlling the throttle or fuel delivery system to cause the engine to develop an amount of torque appropriate to starting the load in motion followed by a clutch engagement cycle in which a series of voltages is applied to the clutch. The engagement cycle provides a first voltage or voltage sequence to ensure engagement of the clutch, a second voltage to rapidly reduce holding torque to induce clutch plate slippage, a third voltage to maintain a desired rate of slippage, and a fourth voltage to lock the clutch plates together.

More specifically, the throttle is opened manually, by release of an idle controller, or by known control means such as solenoids, stepper motors, or other actuation means to a position where the engine would develop the necessary torque output. If the engine employed fuel injection or other such fuel delivery means, the fuel delivery rate would be adjusted in a like manner. The achievement of the specified torque level is determined by a detection means such as, in order of preference, the acceleration to a predetermined rotational speed, attainment of a specific rate of acceleration, or passage of a set time interval. The clutch engagement cycle would then begin. The variable voltages in the clutch engagement cycle would be supplied by a mosfet transistor under control of a pulse width modulation system or by other known power supply means. The first voltage would be high enough to ensure that the clutch plates would be pulled together in a predictable amount of time. Preferably, this would be a voltage sequence consisting of the full rated voltage of the clutch for a period of time sufficient to build the magnetic field to the necessary strength followed by a lesser voltage, typically two-thirds of rated voltage, for an additional time to allow for movement of the plates. The second voltage would be lower, preferably zero, to reduce the field strength and thus holding torque as rapidly as possible. The third voltage should be preselected based on the desired holding torque. Since holding torque is proportional to current, this voltage can be determined by dividing the desired torque by rated maximum torque and multiplying this result by rated voltage. The fourth voltage would preferably be the rated voltage of the clutch.

It is an objective of this invention to broaden the usage of electromagnetic clutches to areas of application where they have currently seen little or no use such as on oil well pumping units. The advantages include much lower initial cost and longer service life. It is a further objective of this invention to facilitate unattended starting and stopping of engines and their driven loads since electromagnetic clutches do not require external actuators.

BRIEF DESCRIPTION OF THE DRAWINGS

FIG. 4 shows the relationship between some of the elements of an embodiment of the invention. The electromagnetic clutch is mounted a drive shaft (28) of the engine. The power produced by the engine is controlled by a throttle having a linkage (29) to a stepper motor.

FIG. 6 illustrates the operation of a solenoid idle controller, a known device which is an element of an embodiment of the invention. The throttle shaft of an engine is rotatively positioned by a throttle lever. The engine governor is attached to said throttle lever by a linkage (30). Also, a solenoid is attached to the throttle lever by a linkage (31). When activated, the solenoid opposes the force exerted by the governor on the throttle lever rotating the shaft to a position corresponding to an engine idle state.

FIG. 9 is a flow chart showing microcontroller program steps which are used in an embodiment of the invention. The microcontroller is able to act as a detection means to determine acceleration of engine speed when this steps are followed. The pulse timer is triggered by an external sensor. The values for previous time and previous engine speed are the saved values for current time and engine speed, respectively, from the preceding calculation cycle.

DESCRIPTION OF THE PREFERRED EMBODIMENTS

Figure 2:
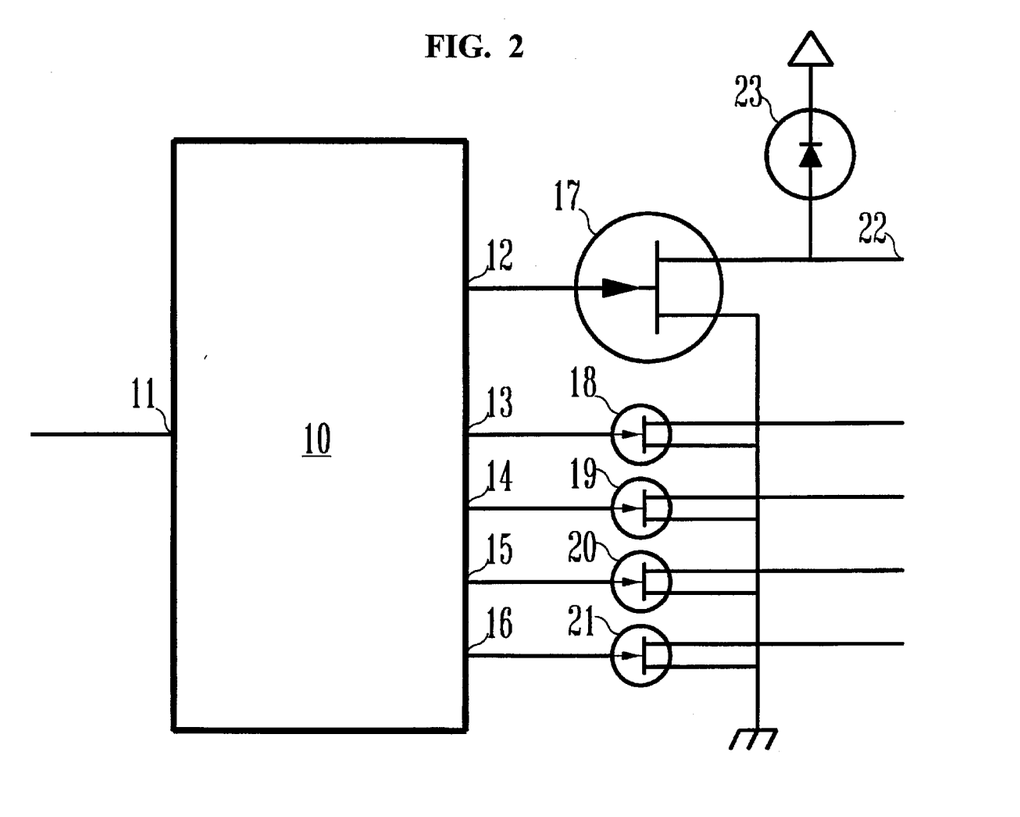
FIG. 2 is a simplified schematic drawing of an electronic circuit which can be used to practice the invention. Well-known microcontroller support circuits such as voltage regulators, reset control, timing crystals, and ground connections have been omitted for clarity.

Referring more particularly to the drawings, FIG. 2 discloses a microcontroller 10 with an input 11 and outputs 12 through 16. Input 11 is connected to an electronic sensor (not shown) which issues pulses relative to the rotation of an engine. Output 12 is connected to the gate of mosfet 17. The source of mosfet 17 is grounded. Mosfet 17 is a logic level device, such as an International Rectifier IRLZ34, which can function as a switch controlled by the level of output 12. The drain of mosfet 17 connects to point 22 in the circuit and to the anode of diode 23. The cathode of diode 23 connects to the 12 volt power supply. One terminal of the clutch, an Ogura Electric MA7FS (not shown), connects to the 12 volt power supply and the other terminal connects to this circuit at point 22. Therefore, when output 12 of microcontroller 10 is set high, mosfet 17 becomes conductive, diode 23 becomes reverse-biased, and a 12 volt potential is applied across the terminals of the clutch. Current then rises in the clutch and the magnetic field strength increases. When output 12 is subsequently set low, mosfet 17 becomes nonconductive and the voltage differential is removed from the clutch terminals. The falling magnetic field then induces a higher voltage on the clutch terminal connected to point 22 and diode 23 becomes forward-biased allowing current to flow back to the 12 volt power supply. By pulse width modulating output 12, the amount of current flowing through the clutch can be regulated. Outputs 13 through 16 of microcontroller 10 are connected to the gates of mosfets 18 through 21 respectively. Mosfets 18 through 21 can be individual discrete devices or they can be on a single chip such as a Texas Instruments TPIC2701N. The drains of these mosfets are each connected to the ground side of a phase of a unipolar stepper motor (not shown). By setting the proper levels of outputs 13 through 16 in the proper sequence, the movement of the stepper motor is controlled. The stepper motor rotates a drive screw which positions the throttle of an engine.

Figure 5:
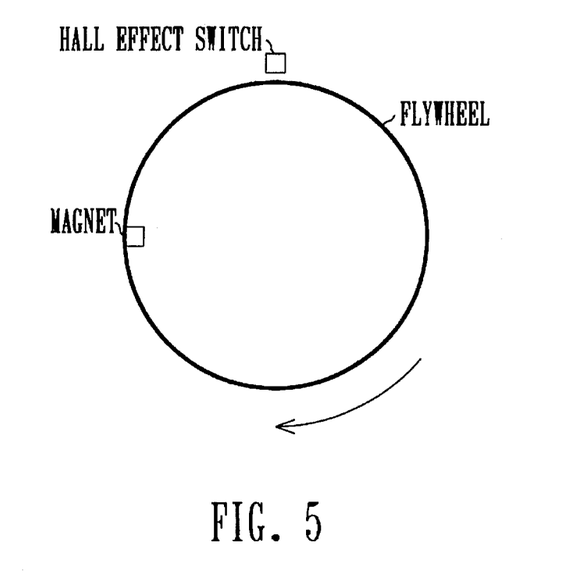
FIG. 5 shows the arrangement of components used to measure engine speed in an embodiment of the invention. A permanent magnet mounted on the flywheel of the engine rotates with the flywheel such that it periodically comes close to a Hall effect switch to activate said switch.

Input 11 is attached to the output of a Hall effect switch (not shown), such as an Allegro MicroSystems A3121LUA, mounted near the flywheel of the engine. A permanent magnet attached to the flywheel becomes adjacent to the Hall effect switch once per revolution and activates it at that time. Many small engines come with such a magnet already mounted on the flywheel as it is used in conjunction with electronic ignition systems. When a Hall effect switch is within a magnetic field of sufficient strength to activate it, it connects its output terminal to ground. Input 11 is thus connected to ground when the magnet on the flywheel passes near the Hall effect switch. Many microcontrollers, such as an NEC UPD78P214CW, come with internal pull-up resistors which can be connected to selected inputs by software commands. This option is employed for input 11 on microcontroller 10 such that input 11 is set high except when the Hall effect switch is activated and pulls it down to ground or low level. A falling edge pulse is then detected by input 11 on each round of the engine. Using a microcontroller to compute the time duration between such pulses is well-known to those skilled in the art of programming microcontrollers.

Output 12 is connected internally within microcontroller 10 to a pulse width modulation timer, a common peripheral device on microcontrollers including the UPD78P214CW. Pulse width modulation is a digital to analog conversion technique defined by a duty cycle and a frequency. The duty cycle is the proportion of the time that the output is set to high level during a cycle with the balance of the time at low level. The frequency is the number of such complete cycles per second. An 8 bit PWM has 256 different duty cycles available ranging from zero to 100 percent. The digital to analog conversion is achieved by filtering the output to attain an average value for the ultimate output voltage. For example, a 50% duty cycle in a 12 volt system would correspond to a 6 volt output. In the current application, the inductance in the clutch itself can be used as the filter. The frequency and duty cycle are set in the pulse width modulation timer by software instructions. A frequency of 6 kilohertz is recommended, but other frequencies can be used. Below about 500 hertz, vibration and fluctuation of holding torque can be a problem. Above 6 kilohertz, it may be necessary to use additional circuitry on the output to provide sufficient current to the gate of mosfet 17.

The manner in which the clutch engagement cycle is initiated will vary depending on how this clutch controller is used. When the engine is nm in an unattended mode, the clutch control would normally become active at the end of a predesignated warm up interval. Otherwise, it could be started manually as with a switch in the power supply to the microcontroller. In any instance, the following sequence would apply. First, the program in microcontroller 10 would cause outputs 13 through 16 to output a sequence of pulses to be applied to the gates of mosfets 18 through 21 to cause the stepper motor to open the throttle to a designated position. The engine, which has been idling at around 1500 rpm, would then respond by increasing its rotational speed. As this is happening, microcontroller 10 is monitoring the time between pulses received at input 11. When the time between pulses reaches the interval corresponding to 2100 rpm, the clutch engagement cycle begins. This point in time is designated as zero in FIG. 1. The first voltage sequence is intended to cause the clutch to engage in a predictable amount of time. Output 12 is set high for 90 milliseconds causing current to rise in the clutch coil to 59.3% of its rated value. At this time, point 24 in FIG. 1, the pulse width modulation timer which controls output 12 is set to a duty cycle of $\frac{2}{3}$ to yield an effective voltage to the clutch terminals of 8 volts. In the ensuing 30 milliseconds, the current in the clutch rises further to 61.2% of maximum at point 25. During this interval or very shortly thereafter, the friction plates of the clutch make contact. The purpose of the next time interval, beginning at point 25, is to reduce the holding torque as rapidly as possible to induce clutch plate slippage. The pulse width modulation timer is set to a duty cycle of zero for 20 milliseconds. This causes the current to fall to approximately 50% at point 26. The pulse width modulation timer is then set to 50% to maintain this current level for 100 milliseconds. During this time the clutch will be slipping to allow the load to come into motion without overloading the engine. After 100 milliseconds have elapsed at point 27, the pulse width modulation timer is set to a duty cycle of 100%. Current then rises to its maximum over a period time to attain the rated holding torque of the clutch.

The acceleration to a preselected rotational speed is the preferred method for determining the beginning of the clutch engagement cycle. The biggest advantage is that this places the clutch engagement cycle in a specific speed range which can be selected based on the torque curve of the engine. Also, it is desirable to keep the speed low since inertia increases with the square of speed. An effective compromise between these considerations for twin cylinder engines is a speed of 2100 rpm. The idle speed and clutch engagement speed must be established with regard to the performance parameters of the particular engine selected. Another method which can be used to start the clutch engagement cycle is the attainment of a given rate of acceleration. Intuitively, this more directly corresponds to the production of significant torque by the engine. However, it is more vulnerable to variation caused by differences in operating conditions than the preferred method. Likewise, waiting a specific mount of time between throttle advance and clutch engagement has the same problem.

Figure 1:
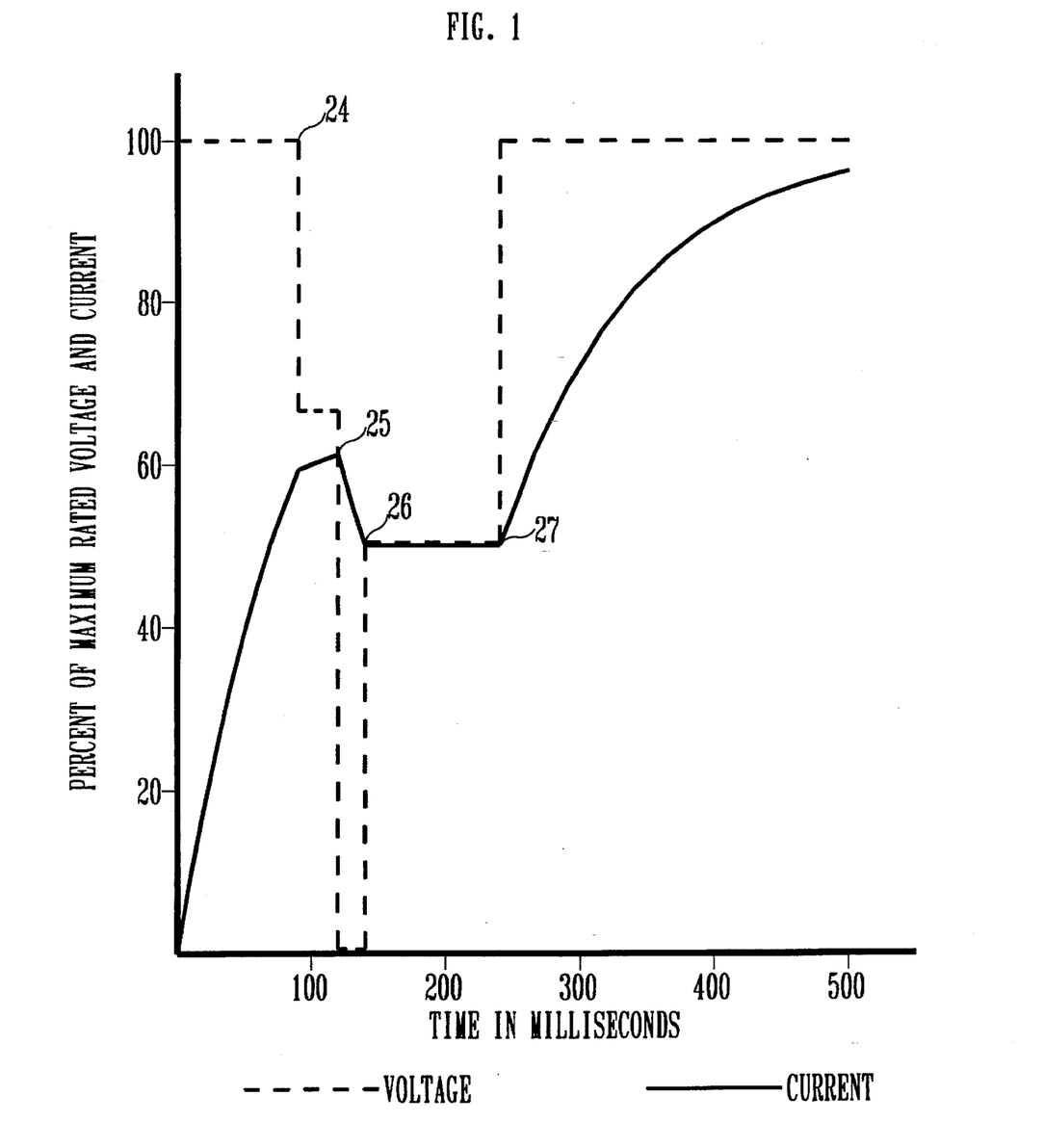
FIG. 1 is a graph of the voltage applied to the clutch versus time and the resulting current during the clutch engagement cycle in an embodiment of the invention. Since holding torque is proportional to current, the curve for current is also indicative of holding torque.

The first voltage sequence, which is intended to draw the clutch plates together, could be implemented as a single voltage rather than the two voltages in sequence as described. For this reason, it is described as the first voltage sequence rather than as two separate voltages. One alternative would be to apply the full rated voltage until sufficient time had elapsed to bring the plates into contact. However, this approach would cause current and holding torque to continue rising at a rapid rate during the time that the plates would be in motion requiring a longer off time in the next cycle and poorer performance. Another alternative would be to set a single voltage of 8 volts for this cycle, but this would require more time for the current to build up to the level where the clutch plates would come together. It is desirable to keep this time as short as possible because the engine is continuing to accelerate and getting further out of the desired speed range.

Figure 3:
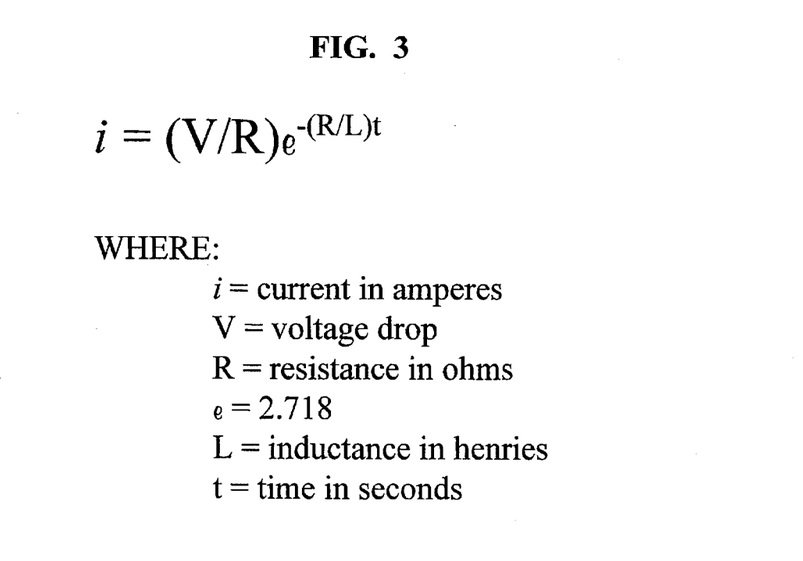
FIG. 3 is the formula for the fall of current in an inductive circuit. It is used to compute the duration of the second voltage in the clutch engagement cycle.
Figure 4:
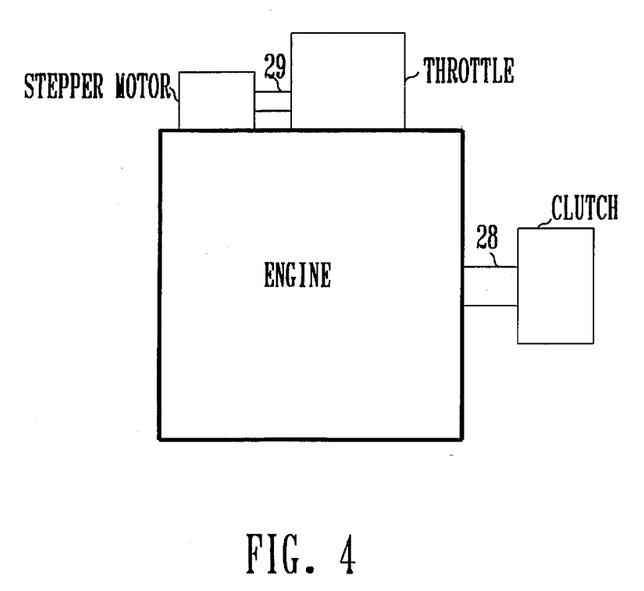

The next voltage, referred to as the second voltage, is calculated to reduce holding torque as rapidly as possible to reach the preselected value. This requires a low voltage. In this embodiment, the chosen voltage is zero. With the proper power supply arrangement, a negative voltage could be provided which would cause an even more rapid fall in holding torque. One way of implementing this would be with an H-bridge of 4 drive transistors. An application with special requirements would be necessary to justify this additional expense and complexity. The length of time at the lower voltage, zero in this embodiment, is calculated according to the known formula relating to the fall of current in an inductive circuit. This formula, which is contained in FIG. 3, can be solved for the proper time interval for any clutch for which the coil resistance and inductance have been measured. The voltage in this formula is the induced voltage at the beginning of the time period less the applied voltage. The induced voltage can be determined from the current and the coil resistance by ohms law (V=IR). In the present example, with an applied voltage of zero, the term V/R is equivalent to the beginning current (I=V/R) of 61.2% at point 25. The value of R/L for the clutch in use is 10. It can be seen that the time of 20 milliseconds will yield the target current of 50%. Similarly, the time at low voltage required to attain any other selected current and holding torque can be determined.

The level and duration of the third voltage determines the amount of clutch slippage. Determining appropriate values for these parameters requires consideration of the rated torque of the engine and the amount of deceleration that can be tolerated in the proposed loading environment. Excessive slippage results in wear and shortened life of the clutch plates. Some testing may be required to find the best slippage for a particular application. The values used in this example and shown in FIG. 1 were found to be effective with a 12.5 horsepower twin cylinder engine powering an oil well pumping unit.

Figure 6:
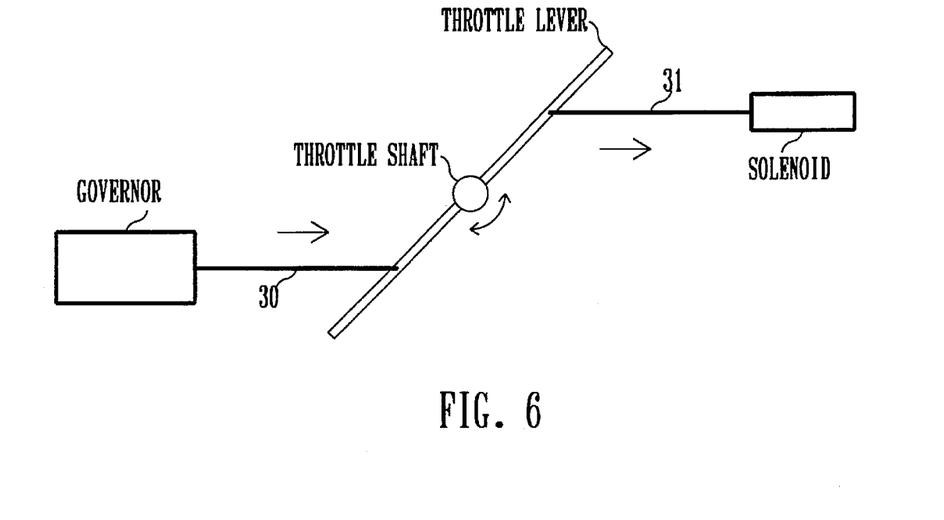
Figure 7:
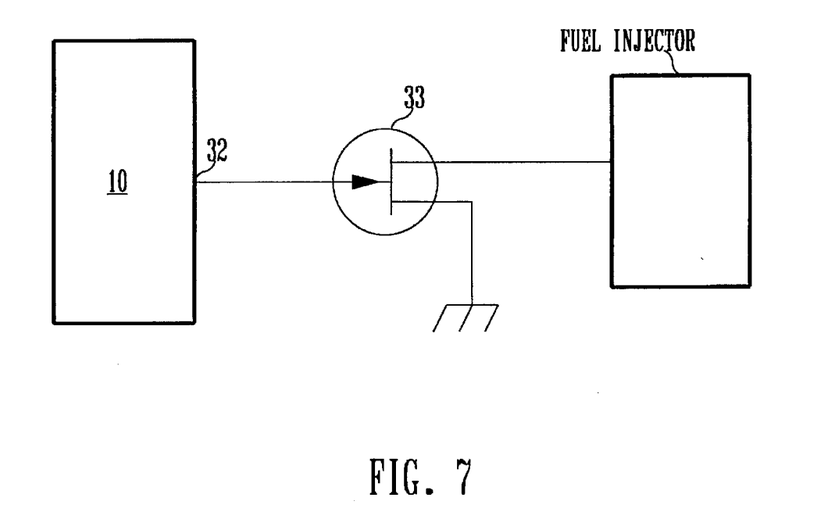
FIG. 7 shows a known means to regulate fuel flow to an engine which is used in an embodiment of the invention. A fuel injector achieves a variable flow rate based on the proportion of time that a mosfet transistor (33) supplies power to said fuel injector with said mosfet transistor in turn controlled by an output (32) of a microcontroller (10).
Figure 8:
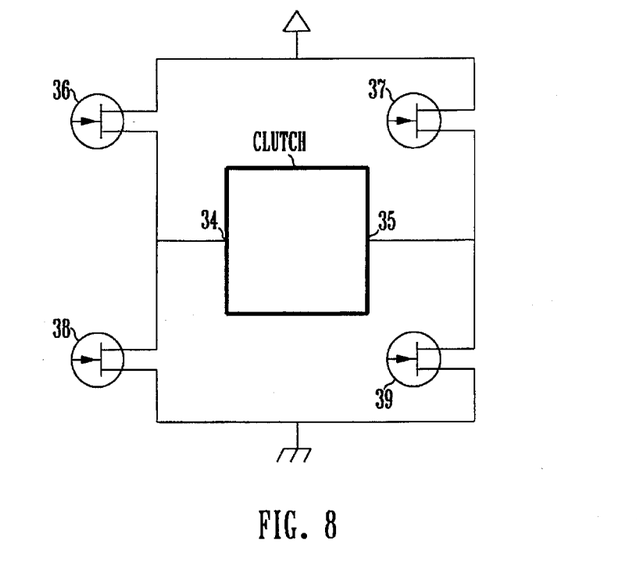
FIG. 8 is an H-bridge which is used in an embodiment of the invention to supply reverse polarity current to an electromagnetic clutch. The clutch has a positive terminal (34) and a negative terminal (35). When mosfets 36 and 39 are turned on, with mosfets 37 and 38 off, normal polarity current is applied to the clutch. A reverse polarity voltage sequence is achieved by mining on mosfets 37 and 38, with mosfets 36 and 39 turned off.
Figure 9:
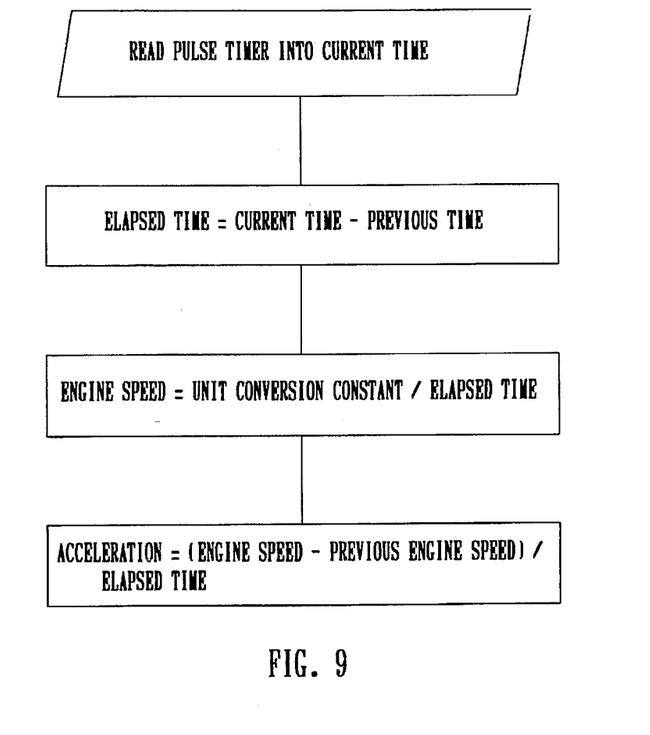

Another embodiment of the invention might be better suited for applications utilizing a mechanical governor. In place of the stepper motor throttle actuator, a solenoid idle controller would be used. Only one mosfet would be required to drive the solenoid rather than the four used for the stepper motor. The combination of output 13 and mosfet 18 would thus be sufficient. During the initial idle warm up, the solenoid would be energized to pull the throttle to the idle position against the governor springs. When it was time to engage the clutch, the solenoid would be released causing the throttle to advance to a high setting. The engine would then develop a substantial amount of torque and accelerate rapidly. The governor would not be actively closing the throttle until the speed approached the governed speed. Therefore, the throttle setting would still be high when the speed at which the clutch engagement cycle was set to begin was attained. From this point on, this embodiment would function in the same manner as the previous one.

I claim:

1. A device to cause the driven load of an internal combustion engine to start in motion comprising:
   an electromagnetic clutch;
   a means to position a throttle or regulate fuel flow of the engine to cause the engine to develop an amount of torque appropriate to starting the load in motion;
   a detection means to designate the point in time when said torque output has been achieved by the engine;
   a variable voltage power supply with timing means to output a series of voltages to the clutch, beginning at the time designated by the said detection means, with such series of voltages comprising a first voltage or voltage sequence to ensure engagement of the clutch, a second lower voltage to rapidly reduce holding torque to induce clutch plate slippage, a third voltage to maintain a desired rate of slippage, and a fourth voltage to lock the clutch plates together.

2. A device according to claim 1 wherein the means to position the throttle is a stepper motor.

3. A device according to claim 1 wherein the means to position the throttle is the release of a solenoid idle controller.

4. A device according to claim 1 wherein the detection means is a device which indicates when the engine has reached a designated rotational speed.

5. A device according to claim 1 wherein the detection means is a device which indicates the attainment of a designated rate of acceleration in the rotational speed of the engine.

6. A device according to claim 1 wherein the detection means is the passage of a specific time interval since the positioning of the throttle or increase in the fuel flow to the engine.

7. A device according to claim 4 wherein the rotational speed of the engine is determined by a microcontroller computing the time between pulses generated by a Hall effect switch which is periodically activated by coming within the field of a permanent magnet mounted on a flywheel of the engine.

8. A device according to claim 1 wherein the variable voltage power supply is implemented by pulse width modulation of a mosfet transistor situated in a circuit with the clutch and a constant voltage power supply.

9. A device according to claim 1 wherein the first voltage sequence comprises a first voltage at the full rated voltage of the clutch for a period of time sufficient for the current to rise to a value at which the clutch will reliably engage followed by a second lower voltage which allows a slower rate of further current increase.

10. A device according to claim 1 wherein the second voltage is zero.

11. A device according to claim 1 wherein the second voltage is of opposite polarity to the other voltages in the series.

12. A device to cause the driven load of a speed-governed internal combustion engine to start in motion comprising:
    an electromagnetic clutch;
    an actuation means to position a throttle or a means to regulate fuel flow of the engine to cause the engine to develop an amount of torque appropriate to starting the load in motion;
    a detection means to designate the point in time when said torque output has been achieved by the engine;
    a variable voltage power supply with timing means to output a series of voltages to the clutch, beginning at the time designated by the said detection means, with such series of voltages comprising a first voltage or voltage sequence to ensure engagement of the clutch, a second lower voltage to rapidly reduce holding torque to induce clutch plate slippage, a third voltage to maintain a desired rate of slippage, and a fourth voltage to lock the clutch plates together.

13. A device according to claim 12 wherein the means to position the throttle is a stepper motor.

14. A device according to claim 12 wherein the means to position the throttle is the release of a solenoid idle controller.

15. A device according to claim 12 wherein the detection means is a device which indicates when the engine has reached a designated rotational speed.

16. A device according to claim 12 wherein the detection means is a device which indicates the attainment of a designated rate of acceleration in the rotational speed of the engine.

17. A device according to claim 12 wherein the detection means is the passage of a specific time interval since the positioning of the throttle or increase in the fuel flow to the engine.

18. A device according to claim 15 wherein the rotational speed of the engine is determined by a microcontroller computing the time between pulses generated by a Hall effect switch which is periodically activated by coming within the field of a permanent magnet mounted on the flywheel of the engine.

19. A device according to claim 12 wherein the variable voltage power supply is implemented by pulse width modulation of a mosfet transistor situated in a circuit with the clutch and a constant voltage power supply.

20. A device according to claim 12 wherein the first voltage sequence comprises a first voltage at the full rated voltage of the clutch for a period of time sufficient for the current to rise to a value at which the clutch will reliably engage followed by a second lower voltage which allows a slower rate of further current increase.

21. A device according to claim 12 wherein the second voltage is zero.

22. A device according to claim 12 wherein the second voltage is of opposite polarity to the other voltages in the series.

* * * * *

UNITED STATES PATENT AND TRADEMARK OFFICE
CERTIFICATE OF CORRECTION

PATENT NO. : 5,662,553
DATED : Sep. 2, 1997
INVENTOR(S) : Gary Reichlinger

It is certified that error appears in the above-identified patent and that said Letters Patent is hereby corrected as shown below:

```
In Claim 8 Line 65 "dutch" should read --clutch--.
In Claim 9 Line 2 "dutch" should read --clutch--.
In Column 3 Line 38 "is mounted a drive" should read
   --is mounted on a drive--.

In Column 4 Line 39 "dutch" should read --clutch--.
In Column 5 Line 28 "nm" should read --run--.
In Column 6 Line 16 "mount" should read --amount--.
```

Signed and Sealed this

Thirtieth Day of December, 1997

Attest:

BRUCE LEHMAN

*Attesting Officer*   *Commissioner of Patents and Trademarks*